United States Patent
Yamamoto et al.

(10) Patent No.: US 9,262,814 B2
(45) Date of Patent: Feb. 16, 2016

(54) IMAGE PROCESSING DEVICE AND METHOD FOR SHARPENING A BLURRED IMAGE

(71) Applicant: KABUSHIKI KAISHA TOSHIBA, Tokyo (JP)

(72) Inventors: Takuma Yamamoto, Kanagawa (JP); Nao Mishima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/459,990

(22) Filed: Aug. 14, 2014

(65) Prior Publication Data

US 2015/0110416 A1    Apr. 23, 2015

(30) Foreign Application Priority Data

Oct. 17, 2013   (JP) .................................. 2013-216039

(51) Int. Cl.
*G06T 5/00* (2006.01)
*G06T 5/50* (2006.01)

(52) U.S. Cl.
CPC . *G06T 5/003* (2013.01); *G06T 5/50* (2013.01); *G06T 2207/10028* (2013.01)

(58) Field of Classification Search
CPC . G06T 5/003; G06T 5/50; G06T 2207/10004; G06T 2207/10028; G06T 2207/20024; G06T 2207/20172
See application file for complete search history.

(56) References Cited

U.S. PATENT DOCUMENTS

| 7,643,019 | B2 * | 1/2010 | Velthoven et al. | 345/204 |
| 8,098,948 | B1 * | 1/2012 | Tzur et al. | 382/255 |
| 8,648,859 | B2 | 2/2014 | Toyoda et al. | |
| 2005/0226498 | A1 * | 10/2005 | Lee | 382/162 |
| 2008/0137978 | A1 * | 6/2008 | Fu | 382/255 |
| 2009/0245676 | A1 * | 10/2009 | Zhu | 382/254 |
| 2011/0050701 | A1 * | 3/2011 | Toyoda et al. | 345/428 |
| 2011/0229044 | A1 * | 9/2011 | Yang et al. | 382/219 |

FOREIGN PATENT DOCUMENTS

| JP | 2000-123168 | 4/2000 |
| JP | 2010-170302 | 8/2010 |

* cited by examiner

*Primary Examiner* — Yubin Hung
(74) *Attorney, Agent, or Firm* — Nixon & Vanderhye, P.C.

(57) ABSTRACT

An image processing device includes a processor and a memory storing instructions causing the processor to: generate a first intermediate image by applying, to an input image, inverse conversion being inverse of conversion corresponding to degrading process of imaging the input image; generating a second intermediate image by adding a frequency component to the input image; generate a weighting factor so that a second residual error between a second image and the input image becomes smaller than a first residual error between a first image and the input image, the first image being obtained by applying the conversion to the second intermediate image, and the second image being obtained by applying the conversion to a composite image obtained by the weighted addition of the first and second intermediate images; and generate the composite image by performing the weighted addition of the first and second intermediate images using the weighting factor.

16 Claims, 7 Drawing Sheets

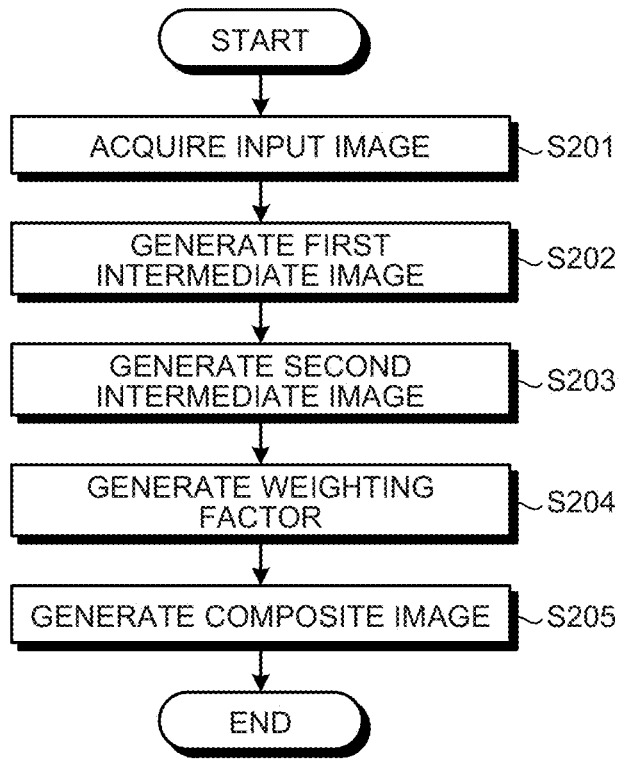
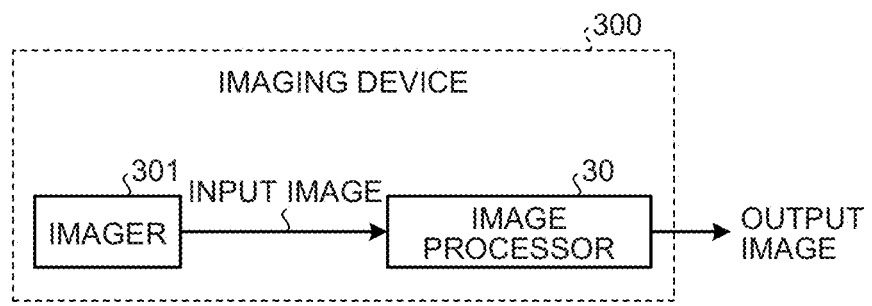

IMAGE PROCESSING DEVICE AND METHOD FOR SHARPENING A BLURRED IMAGE

CROSS-REFERENCE TO RELATED APPLICATIONS

This application is based upon and claims the benefit of priority from Japanese Patent Application No. 2013-216039, filed on Oct. 17, 2013; the entire contents of which are incorporated herein by reference.

FIELD

Embodiments described herein relate generally to an image processing device and an image processing method.

BACKGROUND

There are various factors in the blur of an image obtained by imaging. For example, there are focus blur which is caused by the deviation of a focusing position during imaging and motion blur which occurs by a camera or a subject moving while a shutter of the camera is opening. Further, when an image is scaled up with pixel interpolation, frequency components higher than the Nyquist frequency disappear, and the blur of the image thereby occurs.

In the present specification, the blur of an image is one aspect of image degradation (the degradation from an original image representing an image that should be obtained by imaging) generated in the process of obtaining the image by imaging (hereinbelow, may also be referred to as "imaging process"), and indicates a phenomenon generated by spread of a group of light beams on an image surface, which should focus (be condensed) on one point.

Conventionally, various techniques have been known as a technique for sharpening a blurred image. For example, there is known a technique in which restoration processing for an attenuated frequency components and generation processing for disappeared frequency components are performed at the same time, and an image obtained by the restoration processing and an image obtained by the generation processing are added.

However, in the generation processing of the above conventional technique, the imaging process (degradation process) is not considered at all. Therefore, the conventional technique does not ensure that an image generated by the generation processing is close to the original image. Therefore, an artifact generated in the generation processing may be mixed into a final result of the addition, and, disadvantageously, an image having an appropriate quality cannot be obtained.

BRIEF DESCRIPTION OF THE DRAWINGS

FIG. 6 is a flow chart illustrating the operation of the image processing device of the second embodiment;

FIG. 7 is a diagram illustrating an imaging device of a third embodiment;

DETAILED DESCRIPTION

According to an embodiment, an image processing device includes a processor and a memory that stores processor-executable instructions. When executed by the processor, the instructions cause the processor to execute: generating a first intermediate image by applying inverse conversion to an input image, the inverse conversion being inverse of conversion corresponding to degrading process of imaging the input image; generating a second intermediate image by adding a frequency component to the input image, wherein the frequent component is not included in the input image; generating a weighting factor so that a second residual error between a second image and the input image becomes smaller than a first residual error between a first image and the input image, the first image being obtained by applying the conversion to the second intermediate image, and the second image being obtained by applying the conversion to a composite image obtained by the weighted addition of the first intermediate image and the second intermediate image; and generating the composite image by performing the weighted addition of the first intermediate image and the second intermediate image using the weighting factor.

Hereinbelow, embodiments will be described in detail with reference to the accompanying drawings.

First Embodiment

Figure 1:
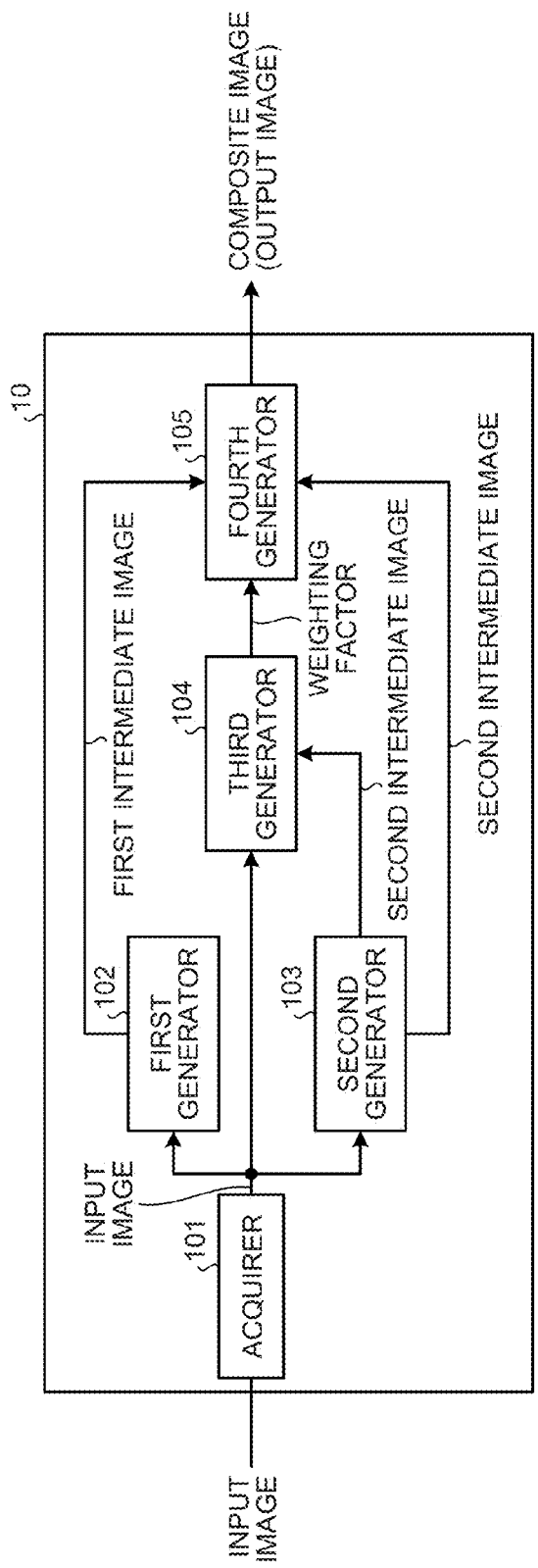
FIG. 1 is a diagram illustrating an image processing device of a first embodiment.

FIG. 1 is a diagram illustrating an image processing device 10 of a first embodiment. As illustrated in FIG. 1, the image processing device 10 is provided with an acquirer 101, a first generator 102, a second generator 103, a third generator 104, and a fourth generator 105.

The acquirer 101 acquires an image obtained by imaging (input image). In the present specification, "imaging" refers to converting an image of a subject (imaging subject) imaged through an optical system such as a lens into an electrical signal.

Figure 2:
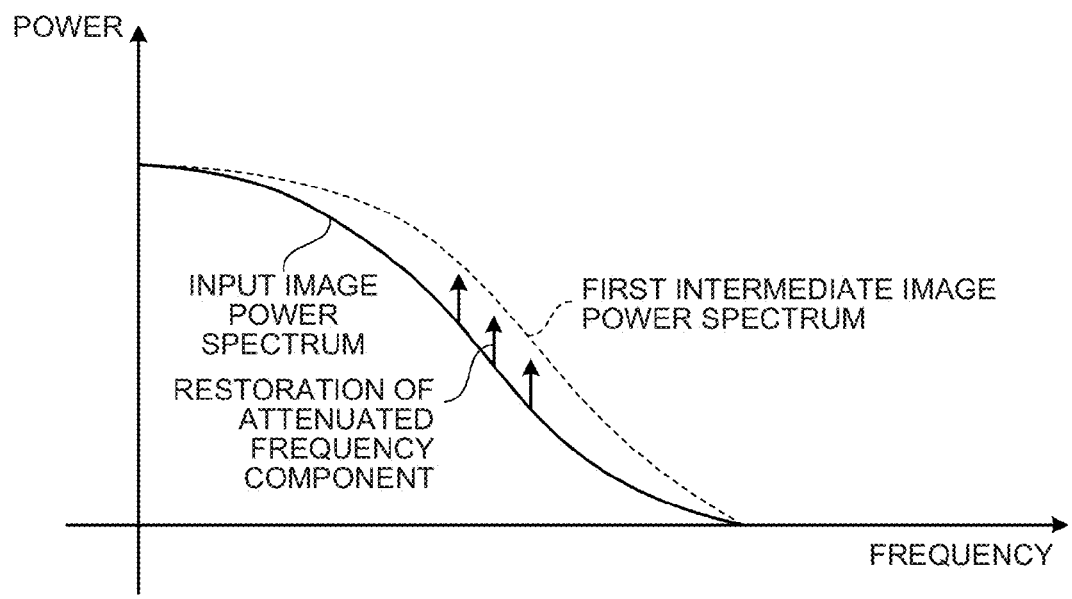
FIG. 2 is a diagram illustrating the power spectrums of an input image and a first intermediate image.

The first generator 102 generates a first intermediate image by applying inverse conversion of conversion corresponding to the operation of degrading an image in the imaging process (the operation of degrading an original image that should be obtained by imaging) to the input image acquired by the acquirer 101. The above conversion can be represented by linear transformation using a matrix corresponding to the operation of degrading an image in the imaging process (the operation of blurring an image in this example). In the first embodiment, the first intermediate image can be regarded as an image obtained by restoring a frequency component attenuated in the imaging process (attenuated due to blur) among frequency components (spatial frequency components) of the input image. FIG. 2 is a diagram schematically illustrating the relationship between the power spectrum of the input image and the power spectrum of the first intermediate image. The power spectrum indicates, for each frequency, how large a component of the frequency included in a target image is.

Hereinbelow, the details of a method for generating the first intermediate image in the first embodiment will be described. When an original image is denoted by x and a matrix representing the operation of blur that occurs in the imaging process of an input image (a matrix corresponding to the operation of degrading an image in the imaging process) is denoted by K, the input image y is represented by the following Equation (1).

$$y = Kx \quad (1)$$

When the total number of pixels of the image is denoted by N, each of x and y is an N-dimensional column vector in which the pixels of the image are arranged in raster scan order, and K is an N×N matrix. When y and K are known, an image in which the blur is restored can be treated as an operation for calculating x. Equation (1) represents a condition to be satisfied by the original image x. Based on a different point of view, Equation (1) can also be considered as an equation representing a condition for ensuring that the image x is close to the original image. The first intermediate image $x_1$ can be calculated, for example, using the following Equation (2) and Equation (3).

$$x_1 \arg_x \min E \quad (2)$$

$$E = \|Kx - y\|^2 \quad (3)$$

Here, $\arg_x \min E$ in Equation (2) represents an arithmetic operation seeking for x that minimizes E. The first intermediate image $x_1$ is analytically calculated by solving $\nabla E = 0$, and can be represented by the following Equation (4).

$$x_1 = (K^T K)^{-1} K^T y \quad (4)$$

Further, E can also be represented by the following Equation (5).

$$E = \|Kx - y\|^2 + \alpha \|Rx\|^2 \quad (5)$$

Further, as R in Equation (5), a unit matrix or a matrix representing a Laplacian filter can be used. The second term of Equation (5) is called a regularization term, and has an effect of suppressing the emphasizing of noises. In this case, the first intermediate image $x_1$ can be represented by the following Equation (6).

$$x_1 = (K^T K + \alpha R^T R)^{-1} K^T y \quad (6)$$

Although E is defined by x and y in which pixels in the entire image are arranged, E is not limited thereto. For example, E can also be defined by a predetermined region around a current pixel. In this case, a value of $x_1$ can be calculated by referring to only pixels within the predetermined region without referring to the pixels in the entire image. Therefore, the calculation cost can be reduced. Further, although an L2 norm is used in E, an L1 norm or a robust function may also be used. Further, in the minimization of E, a repeat calculation such as a steepest descent method, a conjugate gradient method, and an interior point method may be used.

Next, the second generator 103 illustrated in FIG. 1 will be described. The second generator 103 generates, on the basis of the input image acquired by the acquirer 101, a second intermediate image by adding a frequency component that is not included in the input image to the input image.

More specifically, the second generator 103 generates the second intermediate image by amplifying a pixel value of a pixel that is adjacent to a position corresponding to an edge that represents the contour of a subject in the input image. Further more specifically, the second generator 103 generates the second intermediate image by amplifying a pixel value of a pixel that is adjacent to a zero-cross point indicating a point at which a second order differential (second derivative) value of a pixel value changes from a positive value to a negative value or changes from a negative value to a positive value in the input image. In the above manner, the second generator 103 can generate the second intermediate image including a frequency component that is higher than a frequency component included in the input image acquired by the acquirer 101. In this embodiment, the second generator 103 performs processing for generating the second intermediate image for the purpose of newly generating a frequency component that has disappeared in the imaging process (disappeared due to blur).

Although the second generator 103 of the first embodiment generates the second intermediate image by performing nonlinear processing based on a zero-cross point disclosed in JP-A No. 2010-170302, the second generator 103 is not limited thereto. For example, the second generator 103 can also generate the second intermediate image by performing nonlinear processing using a shock filter. In short, the second generator 103 is only required to generate, on the basis of the input image, the second intermediate image by adding a frequency component that is not included in the input image to the input image.

Next, the third generator 104 illustrated in FIG. 1 will be described. The third generator 104 generates a weighting factor which is used in weighted addition (described later) of the first intermediate image and the second intermediate image so that the ratio of the second intermediate image becomes larger and the ratio of the first intermediate image becomes smaller as a first residual error which indicates a residual error between a first image obtained by applying conversion corresponding to the operation of degrading an image in the imaging process to the second intermediate image and the input image. In the first embodiment, the third generator 104 generates a weighting factor that makes the ratio of the second intermediate image larger and the ratio of the first intermediate image smaller as the first residual error which indicates a residual error between an image (first image) obtained by blurring the second intermediate image generated by the second generator 103 with the matrix K and the input image is smaller. More specifically, the weighting factor a is calculated on the basis of the following Equation (7). The details of the weighted addition using the weighting factor a will be described below.

$$a(p) = \exp\left(-\frac{(y(p) - k^T(p)x_2)^2}{2\sigma^2}\right) \quad (7)$$

In Equation (7), p denotes a position vector of a current pixel, y denotes the input image, $x_2$ denotes the second intermediate image, k denotes a column vector obtained by extracting a component relating to the current pixel from the matrix K, and σ denotes a parameter that is appropriately set by a designer. A method for calculating the weighting factor a is not limited to Equation (7). For example, the weighting factor a may also be calculated using a rectangular function which is defined by a fixed threshold t as represented by the following Equation (8).

$$a(p) = \begin{cases} 1 & |y(p) - k^T(p)x_2| < t \\ 0 & |y(p) - k^T(p)x_2| \geq t \end{cases} \quad (8)$$

Further, for example, a liner function may also be used as represented by the following Equation (9).

$$a(p) = c|y(p) - k^T(p)x_2| + 1 \quad (9)$$

In Equation (9), c denotes a parameter that is appropriately set by a designer.

Next, the fourth generator 105 illustrated in FIG. 1 will be described. The first intermediate image generated by the first generator 102, the second intermediate image generated by the second generator 103, and the weighting factor generated by the third generator 104 are input to the fourth generator 105. Further, the fourth generator 105 performs the weighted addition of the first intermediate image and the second intermediate image using the weighting factor generated by the third generator 104 to thereby generate a composite image. The composite image in the first embodiment can be represented by the following Equation (10).

$$x_3(p)=a(p)x_2(p)-(1-a(p))x_1(p) \quad (10)$$

In Equation (10), p denotes the position vector of the current pixel, $x_3$ denotes the composite image, a denotes the weighting factor, $x_2$ denotes the second intermediate image, and $x_1$ denotes the first intermediate image.

Further, the composite image can also be represented by the following Equation (11), for example.

$$x_3(p)=(1-a'(p))x_2(p)+a'(p)x_1(p) \quad (11)$$

In this case, a' in Equation (11) is defined by the following Equation (12).

$$a'(p)=1-a(p) \quad (12)$$

The composite image generated in the above manner is output from the image processing device 10 as an output image.

Figure 3:
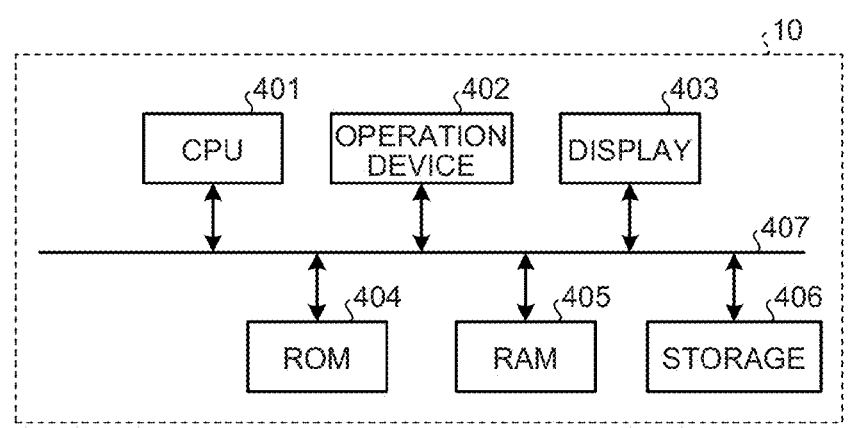
FIG. 3 is a diagram illustrating an example of the hardware configuration of the image processing device according to embodiments.

FIG. 3 is a diagram illustrating an example of the hardware configuration of the image processing device 10 of the present embodiment. In this example, the hardware configuration of the image processing device 10 uses the hardware configuration of a general computer device, and is provided with a CPU 401, an operation device 402, a display 403, ROM 404, RAM 405, and a storage 406, which are connected to each other through an internal bus 407.

The CPU 401 controls the image processing device 10 as a whole. The operation device 402 is a device that is used by a user for various operations. The display 403 is a device that displays thereon various images. The ROM 404 is nonvolatile memory, and unrewritably stores therein a program and various pieces of setting information relating to the control performed by the image processing device 10. The RAM 405 is volatile memory which includes, for example, SDRAM, functions as a working area (work memory) of the CPU 401, and serves as a buffer or the like. The storage 406 includes a magnetically or optically recordable storage medium, and stores therein an input image acquired from the outside through an I/F (not illustrated) and the like. The operation device 402, the display 403, and the storage 406 may be provided outside the image processing device 10.

In the first embodiment, the CPU 401 reads a program stored in the ROM 404 on the RAM 405 and executes the program to thereby implement the functions of the above respective components (the acquirer 101, the first generator 102, the second generator 103, the third generator 104, and the fourth generator 105) of the image processing device 10. Further, not limited to this configuration, for example, at least some of the functions of the respective components of the image processing device 10 may be implemented by a dedicated hardware circuit (semiconductor integrated circuit, for example).

Figure 4:
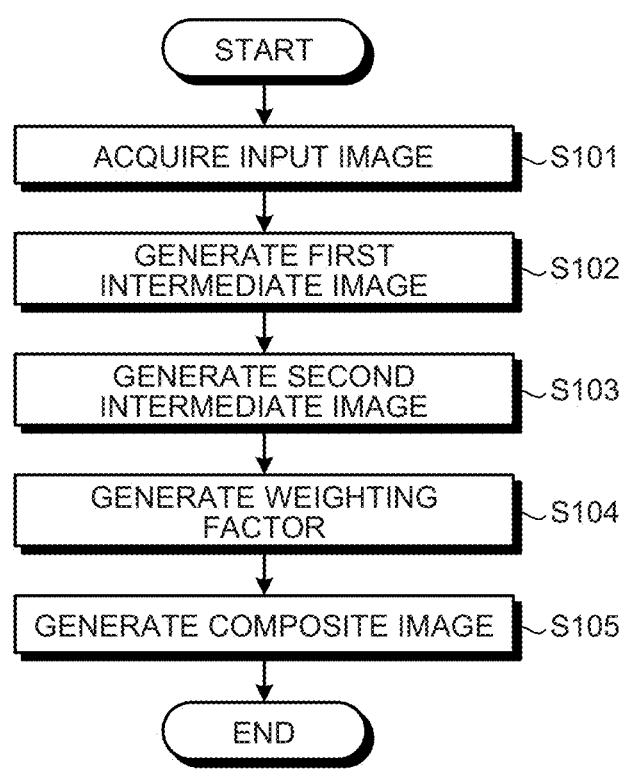
FIG. 4 is a flow chart illustrating the operation of the image processing device of the first embodiment.

Next, an example of the operation of the image processing device 10 of the first embodiment will be described with reference to FIG. 4. FIG. 4 is a flow chart illustrating an example of the operation of the image processing device 10 of the first embodiment. As illustrated in FIG. 4, the acquirer 101 first acquires an input image (step S101). Then, the first generator 102 generates a first intermediate image by applying inverse conversion of conversion corresponding to the operation of degrading an image in the imaging process to the input image acquired in step S101 (step S102). The details thereof are as described above.

Then, the second generator 103 generates, on the basis of the input image acquired in step S101, a second intermediate image by adding a frequency component that is not included in the input image to the input image (step S103). The details thereof are as described above.

Then, the third generator 104 generates a weighting factor which is used in weighted addition of the first intermediate image and the second intermediate image so that the ratio of the second intermediate image becomes larger and the ratio of the first intermediate image becomes smaller as a first residual error which indicates a residual error between a first image obtained by applying conversion corresponding to the operation of degrading an image in the imaging process to the second intermediate image generated in step S103 and the input image acquired in step S101 is smaller (step S104). The details thereof are as described above.

Then, the fourth generator 105 performs the weighted addition of the first intermediate image generated in step S102 and the second intermediate image generated in step S103 using the weighting factor generated in step S104 to thereby generate a composite image (step S105). The details thereof are as described above. Then, the composite image generated in step S105 is output from the image processing device 10 as an output image.

As described above, in the first embodiment, the weighted addition of the first intermediate image and the second intermediate image is performed using the weighting factor that makes the ratio of the second intermediate image larger and the ratio of the first intermediate image smaller as the first residual error which indicates the residual error between the first image obtained by blurring the second intermediate image with the matrix K and the input image (that is, as the second intermediate image is closer to the original image). Therefore, there is generated an image (composite image) in which a region in the second intermediate image, the region being close to the original image (the region that satisfies an equation representing a condition for ensuring that the second intermediate image is close to the original image (Equation (1), for example)), is used more preferentially than the first intermediate image, and a region corresponding to the first intermediate image is preferentially used in a region in the second intermediate image, the region not being close to the original image (the region that does not satisfy the equation representing the condition for ensuring that the second intermediate image is close to the original image).

Accordingly, it is possible to generate an image that includes a frequency component disappeared in the imaging process and has high sharpness while suppressing an artifact caused by the second intermediate image. Further, since the weighting factor can be calculated from the second intermediate image generated by the second generator 103, the known matrix K, and the input image, the calculation cost can also be advantageously reduced.

Second Embodiment

Next, the second embodiment will be described. In the second embodiment, a weighting factor which is used in weighted addition of a first intermediate image and a second intermediate image is generated so as to minimize a second residual error which indicates a residual error between a second image obtained by applying conversion corresponding to the operation of degrading an image in the imaging process (linear transformation using the above matrix K) to a composite image obtained by the weighted addition and an input image. Hereinbelow, the details thereof will be described. Description of overlapping points with the first embodiment will be appropriately omitted.

Figure 5:
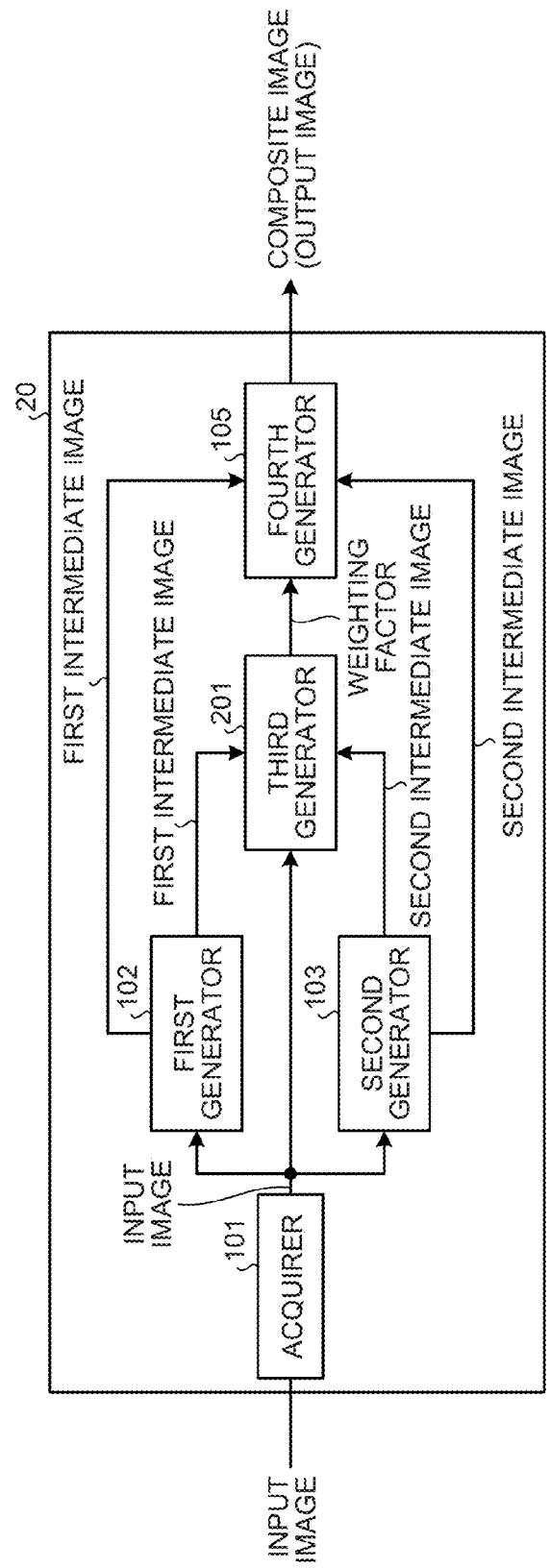
FIG. 5 is a diagram illustrating an image processing device of a second embodiment.

FIG. 5 is a diagram illustrating an image processing device 20 of the second embodiment. As illustrated in FIG. 2, the image processing device 20 is provided with an acquirer 101, a first generator 102, a second generator 103, a third generator 201, and a fourth generator 105. Since the functions of the acquirer 101, the first generator 102, the second generator 103, and the fourth generator 105 are the same as those of the first embodiment, detailed description thereof will be omitted.

The third generator 201 generates the weighting factor that minimizes the second residual error which indicates the residual error between the second image obtained by applying conversion corresponding to the operation of degrading an image in the imaging process (linear transformation using the above matrix K) to the composite image obtained by the weighted addition of the first intermediate image and the second intermediate image and the input image acquired by the acquirer 101. In other words, the third generator 201 generates the weighting factor so as to satisfy a conditional expression (Equation (1), for example) for ensuring that the composite image becomes close to the original image. More specifically, the weighting factor $a_x$ can be calculated using the following Equation (13) and Equation (14). Equation (13) represents seeking for a that minimizes E' under the restriction of 0<a<1.

$$a_x = \arg\min_a E' \ (0 \le a \le 1) \quad (13)$$

$$E' = \|Kx' - y\|^2 \quad (14)$$

In Equation (13), each of $a_x$ and a is a column vector in which weight values are arranged. Further, an inequality with respect to a vector means that the inequality is satisfied with respect to all elements of the vector. Further, x' in Equation (14) denotes the composite image, and is defined by the following Equation (15). Further, Kx' in Equation (14) denotes the second image.

$$x' = Ax_2 + (I - A)x_1 \quad (15)$$

In Equation (15), $x_2$ denotes the second intermediate image, and $x_1$ denotes the first intermediate image. Further, in Equation (15), A denotes a diagonal matrix having a value of a calculated using Equation (13) and Equation (14) as a diagonal component, and I denotes a unit matrix.

Further, a regularization term may be added to E' as represented by the following Equation (16).

$$E' = \|Kx' - y\|^2 + \alpha \|Ra\|^2 \quad (16)$$

Further, although an L2 norm is used in E', an L1 norm or a robustness function may also be used. Further, in the minimization of E', since a constraint inequality exists, a repeat calculation such as a simplex method and an interior point method may also be used.

Next, an example of the operation of the image processing device 20 of the second embodiment will be described with reference to FIG. 6. FIG. 6 is a flow chart illustrating an example of the operation of the image processing device 20. The contents of processing from step S201 to step S203 illustrated in FIG. 6 are the same as those of step S101 to step S103 illustrated in FIG. 4. Therefore, detailed description thereof will be omitted.

After step S203 illustrated in FIG. 6, the third generator 201 generates a weighting factor which is used in weighted addition of the first intermediate image generated in step S202 and the second intermediate image generated in step S203 so as to minimize a second residual error which indicates a residual error between a second image obtained by applying linear transformation using the above matrix K to a composite image obtained by the weighted addition and the input image acquired in step S201 (step S204). The details thereof are as described above.

Then, the fourth generator 105 performs the weighted addition of the first intermediate image generated in step S202 and the second intermediate image generated in step S203 using the weighting factor generated in step S204 to thereby generate the composite image (step S205). In this example, the fourth generator 105 can generate the composite image on the basis of Equation (15). Then, the composite image generated in step S205 is output from the image processing device 20 as an output image.

As described above, in the second embodiment, the weighted addition of the first intermediate image and the second intermediate image is performed using the weighting factor that minimizes the second residual error which indicates the residual error between the second image obtained by blurring the composite image obtained by the weighted addition of the first intermediate image and the second intermediate image with the matrix K and the input image (that is, the weighting factor that satisfies a conditional expression (Equation (1), for example) for ensuring that the composite image is close to the original image). Therefore, as with the first embodiment, it is possible to generate an image that includes a frequency component disappeared in the imaging process and has high sharpness while suppressing an artifact caused by the second intermediate image. Further, in the second embodiment, the weighting factor is generated so as to satisfy the conditional expression for ensuring that the composite image is close to the original image. Therefore, it is possible to generate the composite image having higher quality than that of the first embodiment.

Third Embodiment

Next, the third embodiment will be described. The third embodiment is an example in which the image processing device according to the present invention is applied to an imaging device (sensor). Hereinbelow, the details thereof will be described. Description of overlapping points with the above embodiments will be appropriately omitted.

FIG. 7 is a diagram illustrating an imaging device 300 of the third embodiment. As illustrated in FIG. 7, the imaging device 300 includes an imager 301 and an image processing device 30.

The imager 301 supplies an image obtained by imaging (taken image) to the image processing device 30 as an input image. In this example, the imager 301 includes two cameras (stereo cameras) which are arranged corresponding to respective two viewpoints. An image taken by each of the cameras is supplied to the image processing device 30 as the input image. However, not limited to this configuration, the imager 301, for example, may include a plurality of cameras which are arranged corresponding to respective three or more viewpoints.

Figure 8:
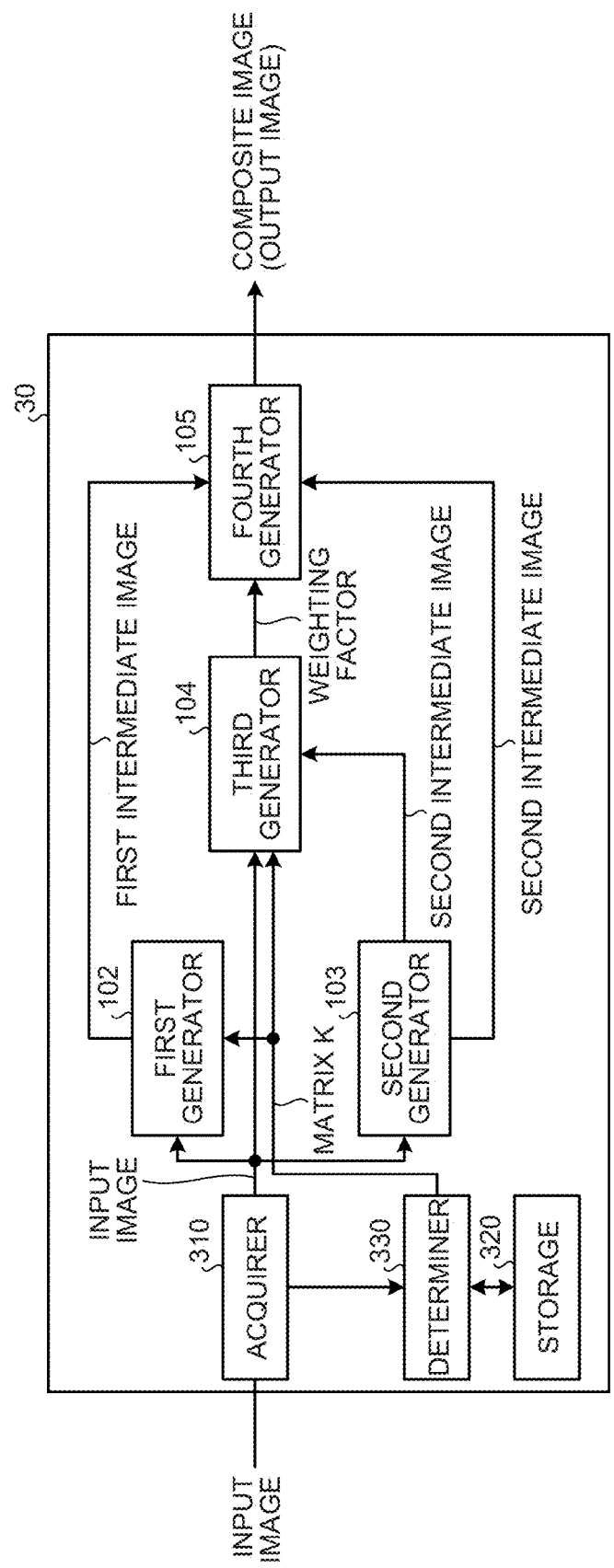
FIG. 8 is a diagram illustrating an image processing device of the third embodiment.

FIG. 8 is a diagram illustrating the image processing device 30. As illustrated in FIG. 8, the image processing device 30 is provided with an acquirer 310, a first generator 102, a second generator 103, a third generator 104, a fourth generator 105, a storage 320, and a determiner 330. Since the functions of the first generator 102, the second generator 103, the third generator 104, and the fourth generator 105 are the same as those of the first embodiment, detailed description thereof will be omitted.

The storage 320 stores therein each depth value of a subject in association with its corresponding matrix K. Herein, the matrix K indicates different values for a plurality of kinds of preprepared depth values.

The acquirer 310 can measure the three-dimensional position of the subject by searching for the position of the corresponding feature point between two taken images acquired from the imager 301 as input images. Accordingly, the acquirer 310 can acquire the depth value of the subject. Further, various known techniques can be used as the searching of the corresponding point in a stereo method. Further, for example, the imager 301 may have a function of calculating the depth value of a subject. In this case, the acquirer 310 can acquire the input image and the depth value from the imager 301.

The determiner 330 determines a matrix K that corresponds to the depth value acquired by the acquirer 310 as the matrix K used in the linear transformation (the matrix K used in processing performed by each of the first generator 102 and the third generator 104). Further, the determiner 330 supplies the determined matrix K to each of the first generator 102 and the third generator 104. In the above manner, in the third embodiment, the matrix K is determined depending on the depth value of a subject.

Figure 9:
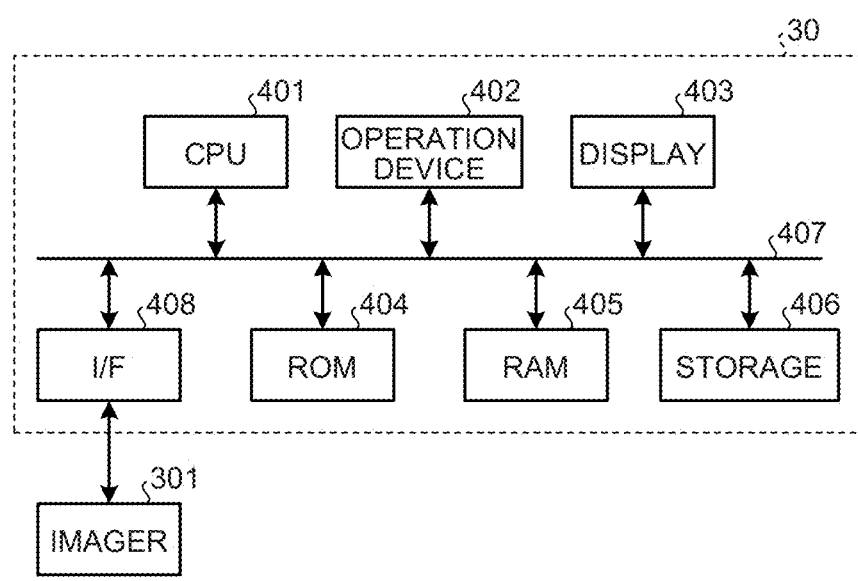
FIG. 9 is a diagram illustrating an example of the hardware configuration of the image processing device of the third embodiment.

FIG. 9 is a diagram illustrating an example of the hardware configuration of the image processing device 30 of the third embodiment. As illustrated in FIG. 9, the configuration of the image processing device 30 is different from the configuration illustrated in FIG. 3 in that an I/F 408 for connecting the image processing device 30 to the imager 301 is further provided. In the third embodiment, a CPU 401 reads a program stored in ROM 404 on RAM 405 and executes the program to thereby implement the functions of the respective components (the acquirer 310, the first generator 102, the second generator 103, the third generator 104, the fourth generator 105, and the determiner 330) of the image processing device 30. Further, not limited to this configuration, for example, at least some of the functions of the respective components of the image processing device 30 may be implemented by a dedicated hardware circuit (semiconductor integrated circuit, for example). Further, the above-described storage 320 may be achieved by a storage 406, or may also be achieved by the ROM 404.

In the first embodiment, the weighting factor that makes the ratio of the second intermediate image larger and the ratio of the first intermediate image smaller as the first residual error which indicates the residual error between the first image obtained by blurring the second intermediate image with the matrix K and the input image is smaller is generated. This satisfies the condition for generating the weighting factor so that the second residual error (the residual error between the second image obtained by blurring the composite image obtained by the weight addition of the first intermediate image and the second intermediate image with the matrix K and the input image) becomes smaller than the first residual error. Further, in the second embodiment, the weighting factor that minimizes the second residual error is generated. This also satisfies the condition for generating the weighting factor so that the second residual error becomes smaller than the first residual error.

That is, each of the functions of the third generator 104 of the first embodiment and the third generator 201 of the second embodiment can be considered to be included in a concept such as "generating the weighting factor so that the second residual error becomes smaller than the first residual error". The concept can also be considered to have meaning such as "generating the weighting factor used in weighted addition of the first intermediate image and the second intermediate image so that the composite image representing an image obtained by the weighted addition becomes closer than the second intermediate image to the original image (an image that should be obtained by imaging).

In short, the third generator according to the present invention is only required to generate the weighting factor used in the weighted addition so that the second residual error becomes smaller than the first residual error.

Further, a program executed in the image processing device (10, 20, or 30) may be stored on a computer connected to a network such as the Internet and provided by being downloaded through the network. Further, a program executed in the image processing device may be provided or distributed through a network such as the Internet. Further, a program executed in the image processing device may be provided by being previously incorporated in a nonvolatile recording medium such as ROM.

Further, the above embodiments and modifications thereof can also be optionally combined with each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
a processor; and
a memory that stores processor-executable instructions that, when executed by the processor, cause the processor to execute:
generating a first intermediate image by applying inverse conversion to an input image, the inverse conversion being inverse of conversion corresponding to degrading process of imaging the input image;
generating a second intermediate image by adding a frequency component to the input image, wherein the frequent component is not included in the input image;
generating a weighting factor so that a second residual error between a second image and the input image becomes smaller than a first residual error between a first image and the input image, the first image being obtained by applying the conversion to the second intermediate image, and the second image being obtained by applying the conversion to a composite image obtained by the weighted addition of the first intermediate image and the second intermediate image; and
generating the composite image by performing the weighted addition of the first intermediate image and the second intermediate image using the weighting factor.

2. The device according to claim 1, wherein the frequent component is generated by using the input image.

3. The device according to claim 1, wherein the generating of the weighting factor includes generating the weighting factor that makes a ratio of the second intermediate image larger.

4. The device according to claim 1, where the generating of the weighting factor includes generating the weighting factor that makes a ratio of the first intermediate image smaller as the first residual error is smaller.

5. The device according to claim 1, wherein the generating of the weighting factor includes generating the weighting factor that minimizes the second residual error.

6. The device according to claim 1, wherein the conversion is linear transformation using a matrix corresponding to the operation.

7. The device according to claim 1, wherein the generating of the second intermediate image includes generating the second intermediate image by amplifying a pixel value of a pixel adjacent to a position corresponding to an edge representing the contour of a subject in the input image.

8. The device according to claim 5, wherein the generating of the second intermediate image includes generating the second intermediate image by amplifying a pixel value of a pixel adjacent to a zero-cross point indicating a point at which a second order differential value of a pixel value changes from a positive value to a negative value.

9. The device according to claim 5, wherein the generating of the second intermediate image includes generating the second intermediate image by amplifying a pixel value of a pixel adjacent to a zero-cross point indicating a point at which a second order differential value of a pixel value changes from a negative value to a positive value in the input image.

10. The device according to claim 4, wherein the memory further stores therein:
   each depth value of a subject in association with its corresponding matrix;
   an acquirer configured to acquire the depth value; and
   a determiner configured to determine the matrix corresponding to the depth value acquired by the acquirer as the matrix used in the conversion.

11. An image processing method comprising:
   generating a first intermediate image by applying inverse conversion of conversion corresponding to operation of degrading an image in an imaging process to an input image;
   generating, on the basis of the input image, a second intermediate image by adding a frequency component that is not included in the input image to the input image;
   generating a weighting factor used in weighted addition of the first intermediate image and the second intermediate image so that a second residual error becomes smaller than a first residual error, the first residual error indicating a residual error between a first image and the input image, the second residual error indicating a residual error between a second image and the input image, the first image being obtained by applying the conversion to the second intermediate image, and the second image being obtained by applying the conversion to a composite image obtained by the weighted addition of the first intermediate image and the second intermediate image; and
   generating the composite image by performing the weighted addition using the weighting factor.

12. The method according to claim 11, wherein the generating of the second intermediate image includes generating the second intermediate image by performing nonlinear processing using a shock filter.

13. The method according to claim 11, wherein the conversion is linear transformation using a matrix corresponding to the operation.

14. A processing device comprising:
   a circuitry that generates a first intermediate image by applying inverse conversion to an input image, the inverse conversion being inverse of conversion corresponding to degrading process of imaging the input image;
   a circuitry that generates a second intermediate image by adding a frequency component to the input image, wherein the frequent component is not included in the input image;
   a circuitry that generates a weighting factor so that a second residual error between a second image and the input image becomes smaller than a first residual error between a first image and the input image, the first image being obtained by applying the conversion to the second intermediate image, and the second image being obtained by applying the conversion to a composite image obtained by the weighted addition of the first intermediate image and the second intermediate image; and
   a circuitry that generates the composite image by performing the weighted addition of the first intermediate image and the second intermediate image using the weighting factor.

15. The device according to claim 14, further comprising an imager that captures the input image.

16. The device according to claim 15, wherein the conversion and the inverse conversion are determined according to an imaging parameter used when the input image is captured.

* * * * *